(12) United States Patent
Bollo

(10) Patent No.: US 6,202,693 B1
(45) Date of Patent: Mar. 20, 2001

(54) CERAMIC DISC CARTRIDGE FOR MIXING FLUIDS IN FAUCETS AND THE LIKE

(76) Inventor: Patrizia Bollo, Via Stazione, 21, 28010, Cavaglio d'Agogna (Novara) (IT)

( * ) Notice: Subject to any disclaimer, the term of this patent is extended or adjusted under 35 U.S.C. 154(b) by 0 days.

(21) Appl. No.: 09/332,831

(22) Filed: Jun. 14, 1999

(30) Foreign Application Priority Data

Feb. 10, 1999 (IT) .............................. MI99A0259

(51) Int. Cl.$^7$ ................................. F16K 11/074
(52) U.S. Cl. ................... 137/625.17; 137/625.4; 137/636.2
(58) Field of Search .............. 137/625.17, 625.4, 137/636, 636.2

(56) References Cited

U.S. PATENT DOCUMENTS

| 4,088,153 | * | 5/1978 | Paasikivi | ..................... | 137/625.17 |
|---|---|---|---|---|---|
| 4,325,403 | * | 4/1982 | Uhlmann | ..................... | 137/625.17 X |
| 4,362,186 | * | 12/1982 | Parkison et al. | ................ | 137/625.17 |
| 4,738,281 | * | 4/1988 | Limet et al. | ..................... | 137/625.17 |
| 4,986,306 | * | 1/1991 | Ferrari | ..................... | 137/625.17 |
| 5,095,934 | * | 3/1992 | Iqbal | ..................... | 137/636.2 X |

* cited by examiner

Primary Examiner—John Rivell
(74) Attorney, Agent, or Firm—Hedman & Costigan, P.C.

(57) ABSTRACT

The present invention relates to a ceramic disc cartridge for mixing fluids in faucets and the like, which comprises a driving rod for driving a movable ceramic disc, the rod being coupled to the body of the cartridge by a ball-type of movement.

The movable ceramic disc driving rod drives the movable ceramic disc with a hunting type of movement.

5 Claims, 4 Drawing Sheets

CERAMIC DISC CARTRIDGE FOR MIXING FLUIDS IN FAUCETS AND THE LIKE

BACKGROUND OF THE INVENTION

The present invention relates to a ceramic disc cartridge for mixing fluids in faucets and the like.

As is known, fluid mixing faucets conventionally comprise ceramic disc cartridges which, in their basic concept, can be classified into three types and, more specifically, a first direct movement type, a second indirect movement type and a third ball-movement type.

In the direct movement cartridges, the movable plate is coupled to a driving rod which drives said movable plate with an opening and closing movement (either frontward or inward), the rotary movement being provided by an element thereon the rod is pivoted by suitable pivoting means.

More specifically, this rotary movement is provided by a specifically designed rod, including, for example, parallel planes, fork end portions, or rack end portions, and so on.

Under the effect of the combination of two distinct and separate movements, the movable plates, at any positions thereof between the maximum closure and maximum opening positions thereof, will always perform a full maximum rotary movement, from a hot to a cold position, being delimited by suitable detent means.

In the indirect movement cartridges, which movement is also called an idling or hunting movement, as shown in FIG. 1, the collar 1 supports a rod 2 through a pin 3 operating as a pivot pin for the driving rod 2.

The collar 1 is engaged within a cover 4.

The rotary movement of the collar 1, engaged in the cover 4, is delimited by detent elements 5, provided on the flange 6 of the collar, said detent elements engaging with counter-detent elements 7 formed on the cover.

The ball-shaped end portion 8 of the rod 2 is provided for engaging in a corresponding recess, defined by the coupling body 10, which is provided with a lug 11 having a rounded configuration provided for engaging in a guide 12.

The latter is defined by the cover 4 between the counter-detent elements 7.

With the cartridge in its closed condition, the ball 8 of the rod 2 and related recess of the coupling body 10 are coaxial with respect to the hole 13 defined by the cover 2 and are also coaxial with respect to the cylindric body 14 of the collar 1.

By turning the cartridge rod on itself, for performing the mixing movement, while it is in its closing position, the ball 8 will turn in its recess without causing any movements of the coupling body 10.

The coupling body 10, in particular, is coupled to the movable ceramic plate 15 of the cartridge.

As the driving rod is displaced from the full closure position to the opening position thereof, which can be either a partial or a full opening position, and is turned in the mixing direction, the lever arm, formed between the ball position and the axis of the hole 13 of the cover 4, will allow the coupling body 10 connected to the movable plate 15 to be displaced.

This displacement of said body 10 will increase as the lever arm provided by the opening of said rod is increased.

The resultant displacement, which is also called a "hunting" type of displacement, is a characteristic movement and it is generated by a combination of a rotary movement of the casing in the recess in which the ball 8 is engaged, with respect to the hole 13, and the sliding movement of the lug 11 in the guide 12 of the cover 4.

The sliding of the guide lug constitutes a constraint and, accordingly, it subtracts a freedom degree from the system.

This type of movement can be considered like to the rod movement of a rod-crank mechanism, and the coupling body 10 can be compared to the rod having an end portion thereof coupled to a piston (the lug 11 sliding in the guide 12) and the other end thereof coupled to the crankshaft formed by the casing in which the ball 8 is engaged.

In this mechanism, the crank radius corresponds to the opening displacement of the ball, with respect to the rotary center, i.e. the hole 13 of the cover, and, accordingly, it can be continuously varied from 0, with the rod in a vertical condition and the cartridge in a closed condition, to a maximum value, i.e. with the rod in a slanted condition and the cartridge in a full opened condition.

The third known type, as stated, is a so-called ball or spherical displacement, in which the rod can be driven or displaced with a "cloche" type of movement, through a ball type of articulation.

This movement is performed by a direct movement plate and, accordingly, with the rod which cannot turn about its vertical axis, with respect to the plate, or with the rod provided with a ball end portion, but by limiting the possible displacement of the movable plate.

In the second case, due to the lacking of a constraint, the plate can turn with respect to the axis of the ball thereon it is pivoted.

Accordingly, its configuration can be exclusively a circular configuration, with the center thereof arranged in the seat or recess for the ball: the hollow providing the communication between the inlet and the outlet can also be exclusively of circular configuration and concentrically arranged with respect to the ball.

SUMMARY OF THE INVENTION

The aim of the present invention is to provide a ceramic disc cartridge for mixing fluids in faucets and the like, which comprises all of the combined advantages of the hunting displacement lever cartridges and spherical displacement cartridges, while overcoming the drawbacks thereof.

Within the scope of the above mentioned aim, a main object of the present invention is to provide such a cartridge which can be practically derived from a hunting type of cartridge, to be easily made by unexpensive making and assembling apparatus, since the most part of the cartridge components will be of a conventional type.

Another object of the present invention is to provide such a cartridge the driving rod of which is specifically designed for turning on itself, thereby allowing to make an un-oriented configuration handle, for example a ball or a cone frustum, having a facilitated operation.

Yet another object of the present invention is to provide such a cartridge which can be inter-exchanged with a conventional cartridge as well as a ball-displacement cartridge.

Yet another object of the present invention is to provide such a cartridge which can be easily made by starting from easily available elements and materials and which, moreover, is very competitive from a mere economic standpoint.

According to one aspect of the present invention, the above mentioned aim and objects, as well as yet other objects, which will become more apparent hereinafter, are achieved by a ceramic disc cartridge for mixing fluids in faucets and the like, characterized in that said cartridge comprises a driving rod for driving a movable ceramic disc, said driving rod being coupled to a body of said cartridge with a spherical or ball type of movement, said driving rod driving said movable ceramic disc with a hunting movement.

BRIEF DESCRIPTION OF THE DRAWINGS

Further characteristics and advantages of the present invention will become more apparent from the following detailed disclosure of a preferred, though not exclusive, embodiment of a ceramic disc cartridge for mixing fluids in faucets and the like, being shown, by way of an indicative but not limitative example, in the accompanying drawings, where.

DESCRIPTION OF THE PREFERRED EMBODIMENTS

Figure 1:
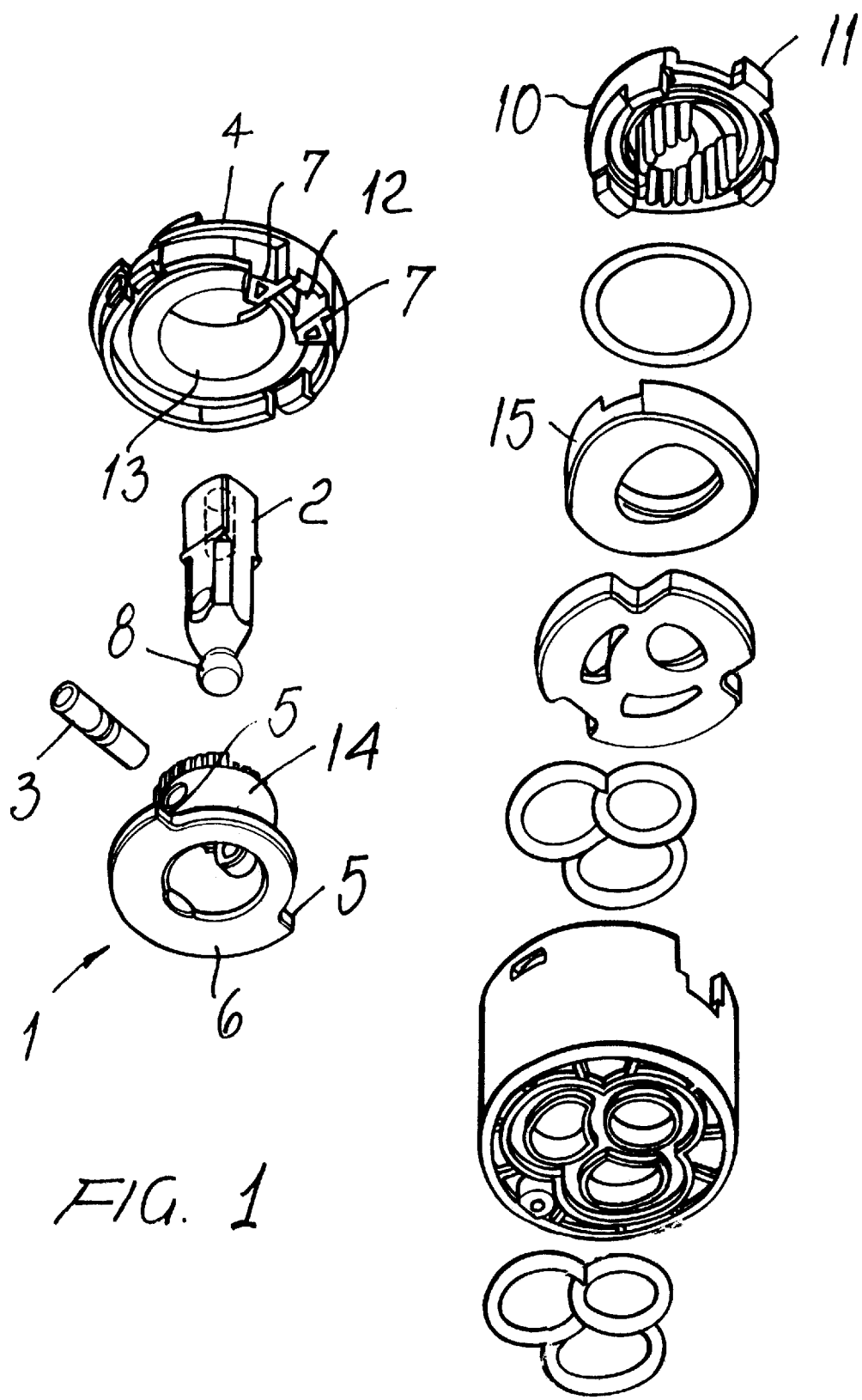
FIG. 1 illustrates a prior ceramic disc cartridge, of the hunting-displacement or movement type.
Figure 2:
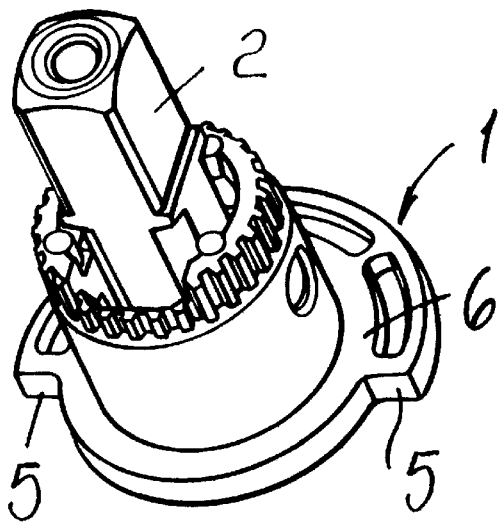
FIG. 2 is a perspective view illustrating the driving rod and collar of the prior cartridge.
Figure 5:
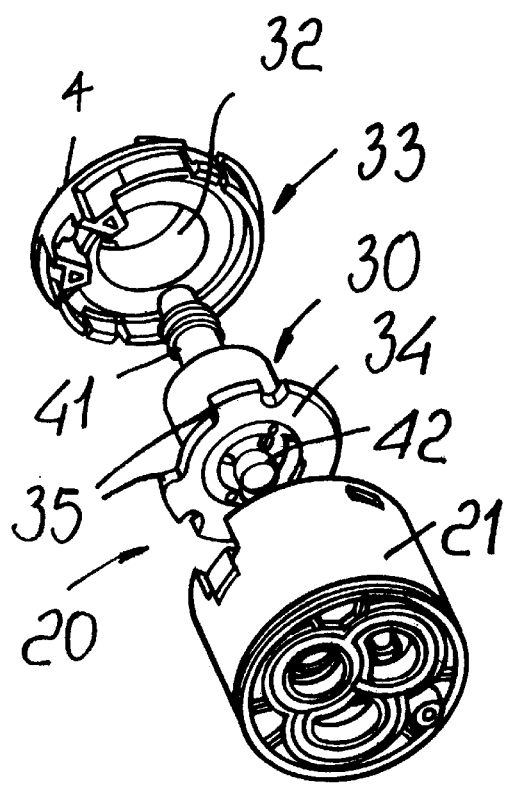
FIG. 5 illustrates the inventive cartridge with the collar and closure cover represented in an exploded form.
Figure 6:
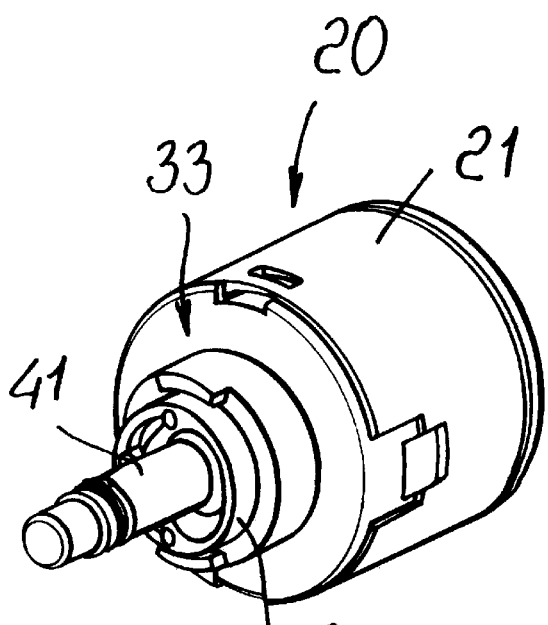
FIG. 6 is a further schematic perspective view illustrating the cartridge according to the invention.
Figure 3:
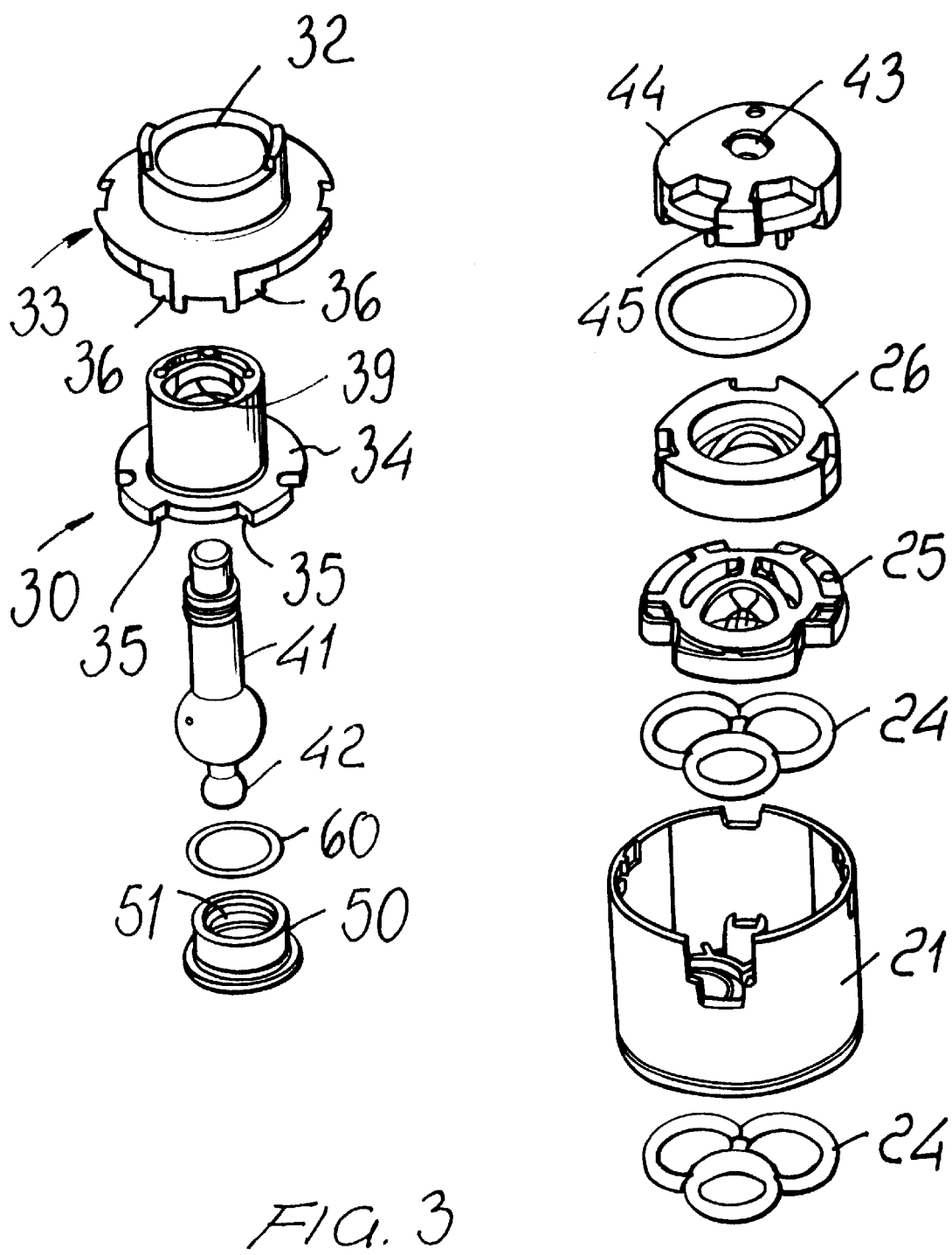
FIG. 3 is a schematic exploded perspective view illustrating a cartridge according to the invention.
Figure 4:
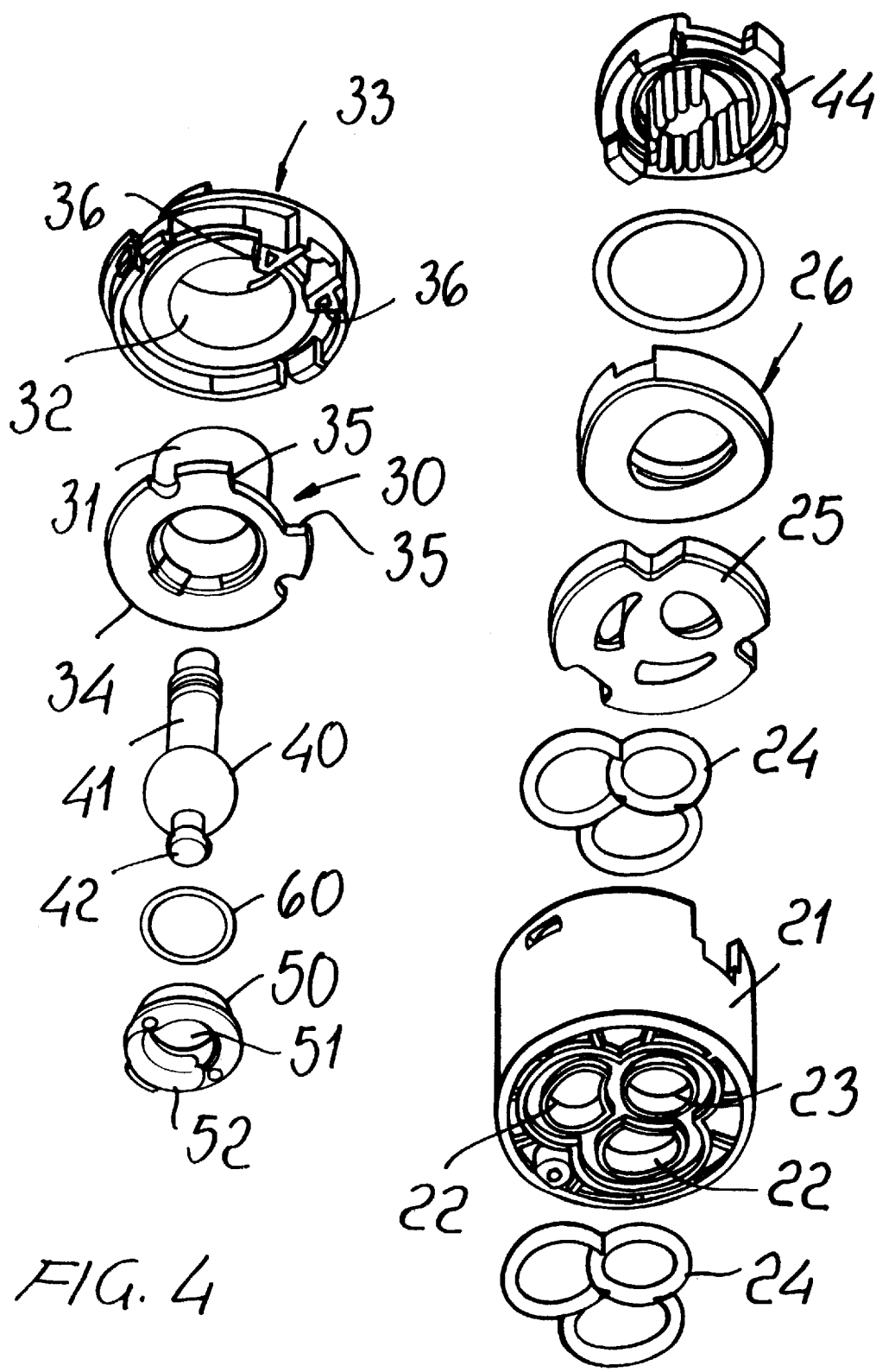
FIG. 4 is a further bottom exploded perspective view illustrating the cartridge according to the invention.

With reference to the number references of the above mentioned figures, the cartridge according to the present invention, which has been generally indicated by the reference number 20, comprises a cartridge body 21, through the bottom thereof are respectively provided a plurality of holes 22 for hot and cold water, as well as an outlet hole 23 for the outlet of the mixed water.

Gaskets 24 are arranged at said holes.

A fixed ceramic disc 25 is arranged above said gasket 24, and a movable ceramic disc 26 is further provided for cooperating with said fixed ceramic disc 25.

For driving or operating said movable ceramic disc, a collar 30 is provided, said collar including a cylindric body 31 to be engaged in an axial hole 32 of a cover 33.

As shown, the collar 30 is provided with a bottom flange 34 having a size larger than that of the flange of the corresponding feature provided in the prior art.

Said flange 34 is provided with detent elements 35 adapted to be engaged with a perfect contact with counter-detent elements 36, formed on said cover 33, thereby preventing said collar 30 from turning with respect to the axial hole 32 of the cover 33.

Inside the cylindric body of the collar 30 a spherical region 39 for engaging therein the spherical body 40 formed on a driving rod 41 is provided.

Said driving rod 41, in particular, is provided, at an inner end portion thereof, with a further spherical body 42 which can be engaged in a recess 43 formed on the coupling body 44 provided for connection with the movable ceramic disc 26.

As shown, the further spherical body 42 has a size smaller than that of the spherical body 40, the spherical bodies having the same vertical central axis coinciding with that of the driving rod 41.

A flanged bush 50 engaging inside the collar 30 and defining a contoured recess 51 for receiving therein the spherical body 40 of the driving rod 41 is moreover provided.

The bush 50 has a smooth outer surface cylindrical portion and a bottom annular flange integral therewith and is specifically designed for preventing the driving rod 41 from being downward displaced.

The disclosed assembly comprises moreover a sealing ring 60 preventing extraneous substances from entering the system, while compensating for possible clearances.

The displacement of the movable ceramic plate 26 along a set displacement path can be easily performed since said movable ceramic plate is bound, by the lug 45 of the coupling body 44, to be driven with a "hunting" type of displacement, since the lug 45 will remove a freedom degree from the overall ball system.

In this connection it should be apparent that the lug 45, which, in the drawings, is constituted by a male element to be engaged in a corresponding female recess formed on the cover 33, can also be made with a reversed configuration, i.e. as a female guide on the coupling body 44 and a lug on the cover 33, since, even with very small kinematic differences, the resultant movement would be practically the same.

The driving rod displacement will be limited by suitably contouring the top end portion 39 of the collar, or the bottom opening 52 of the bush 50.

Thus, owing to the disclosed arrangement, the driving rod can turn on itself, i.e. with respect to its vertical axis.

With the disclosed arrangement, in particular, the provided cartridge will substantially comprise the elements constituting a hunting displacement type of cartridge, but with a driving rod which can be spherically driven, thereby providing the combine advantages of the two types, which represents a peculiar aspect of the present invention.

The invention, as disclosed, is susceptible to several modifications and variations, all of which will come within the scope of the invention.

Moreover, all of the constructional details can be replaced by other technically equivalent elements.

In practicing the invention, the used materials, as well as the contingent size and shapes, can be any, depending on requirements.

What is claimed is:

1. A ceramic disc cartridge, for mixing fluids in faucets, said cartridge having a cartridge body and a cover therefore, a collar engaged in said cover and a driving rod rotatably coupled to said cartridge body for swingably driving a movable ceramic disc, said driving rod having a first spherical body defined in a middle portion thereof and engaged in said collar, said collar having a cylindrical portion and bottom flange defining detent elements which can be engaged with counter-detent elements provided in said cover to prevent said cylindrical portion of said collar from turning in said cover, said driving rod being provided, at a bottom end portion thereof, with a second spherical body be engaged in a recess defined on a coupling body for connection to said movable ceramic disc, said first and second spherical bodies having a same vertical axis coinciding with a vertical axis of said driving rod, a bush engaged in said collar and having a recess therein for engaging said first spherical body, said bush having a smoothly cylindrical outer surface and a bottom annular flange.

2. A cartridge, according to claim 1, wherein a sealing ring is arranged between said bush and said first spherical body.

3. A cartridge, according to claim 1, wherein said coupling body comprises a lug which is slidably engaged in a female recess defined on said cover.

4. A cartridge, according to claim 1, wherein aid collar has a top portion including a contoured portion operating as limit means for said driving rod.

5. A cartridge, according to claim 1, wherein said bush has a contoured bottom portion operating as limit means for said driving rod.

* * * * *